(12) United States Patent
Shtok et al.

(10) Patent No.: US 10,108,876 B2
(45) Date of Patent: Oct. 23, 2018

(54) RECOGNITION-BASED COLOR CORRECTIONS

(71) Applicants: Joseph Shtok, Haifa (IL); Asaf Tzadok, Nesher (IL)

(72) Inventors: Joseph Shtok, Haifa (IL); Asaf Tzadok, Nesher (IL)

(73) Assignee: International Business Machines Corporation, Armonk, NY (US)

(*) Notice: Subject to any disclaimer, the term of this patent is extended or adjusted under 35 U.S.C. 154(b) by 318 days.

(21) Appl. No.: 15/019,976

(22) Filed: Feb. 10, 2016

(65) Prior Publication Data

US 2017/0228611 A1     Aug. 10, 2017

(51) Int. Cl.
*G06K 9/46* (2006.01)
*G06K 9/62* (2006.01)
*G06T 7/40* (2017.01)
*G06T 7/00* (2017.01)
*G06T 5/20* (2006.01)
*H04N 9/73* (2006.01)

(52) U.S. Cl.
CPC ......... *G06K 9/4652* (2013.01); *G06K 9/6202* (2013.01); *G06T 5/20* (2013.01); *G06T 7/003* (2013.01); *G06T 7/401* (2013.01); *G06T 7/408* (2013.01); *H04N 9/735* (2013.01); *G06T 2207/10024* (2013.01)

(58) Field of Classification Search
CPC .... G06K 9/4652; G06K 9/6202; H04N 9/735; G06T 5/20; G06T 7/401; G06T 7/408; G06T 7/003; G06T 2207/10024
USPC .......................................................... 382/103
See application file for complete search history.

(56) References Cited

U.S. PATENT DOCUMENTS

| | | | |
|---|---|---|---|
| 6,621,929 B1* | 9/2003 | Lai .................. | G06K 9/6202 382/181 |
| 8,805,014 B2 | 8/2014 | Ross et al. | |
| 2008/0013789 A1* | 1/2008 | Shima ............... | G06K 9/00798 382/104 |
| 2012/0323620 A1 | 12/2012 | Hofrnan et al. | |
| 2013/0336583 A1* | 12/2013 | Ernst .................. | G06K 9/6202 382/165 |
| 2015/0049902 A1 | 2/2015 | Moraleda et al. | |
| 2015/0172513 A1* | 6/2015 | Noorkami .......... | H04N 1/6077 348/223.1 |

* cited by examiner

*Primary Examiner* — Amandeep Saini

(57) ABSTRACT

A method comprising: performing a first object recognition round on an image to detect at least a first object; matching the first detected object to a first reference object, thereby recognizing the first object; determining a chromatic adaptation transform between the first recognized object and the first reference object; applying the chromatic adaptation transform to the image; performing a second object recognition round on the chromatically adapted image to detect a second object that is different than the first recognized object; and matching the second detected object with a second reference object, thereby recognizing the second object.

11 Claims, 15 Drawing Sheets

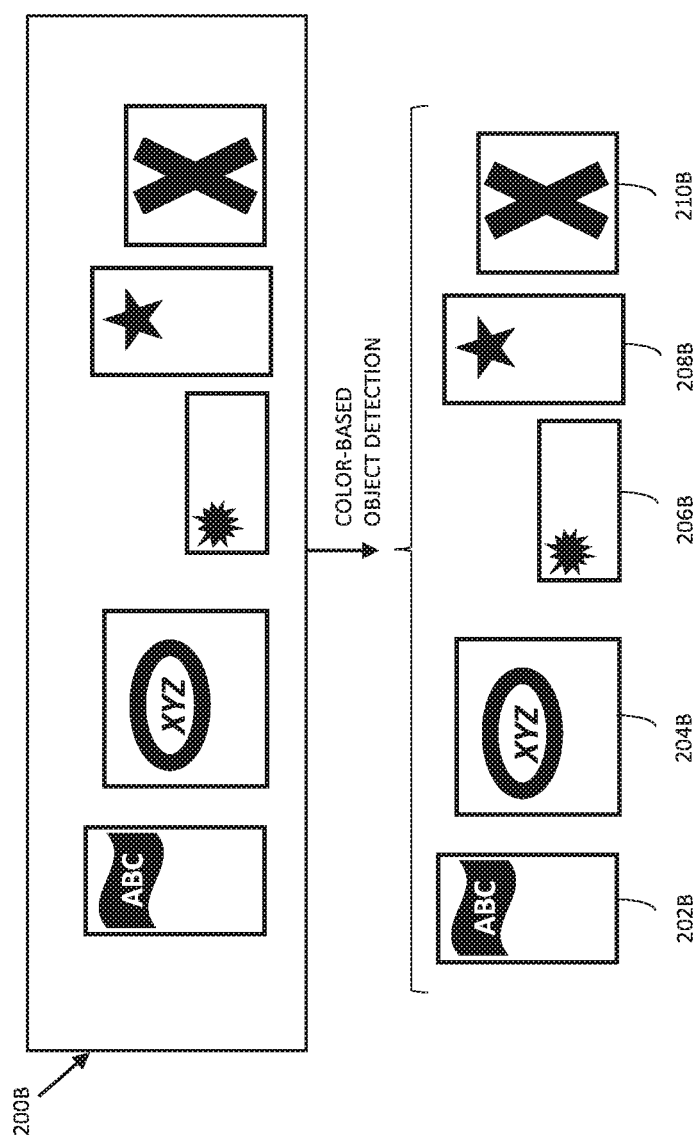

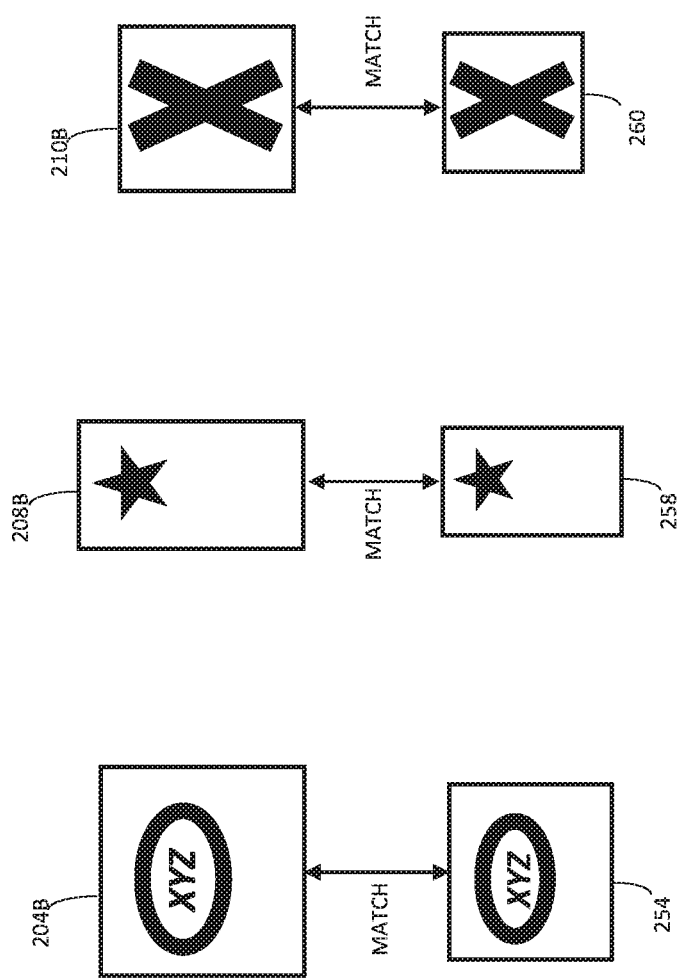

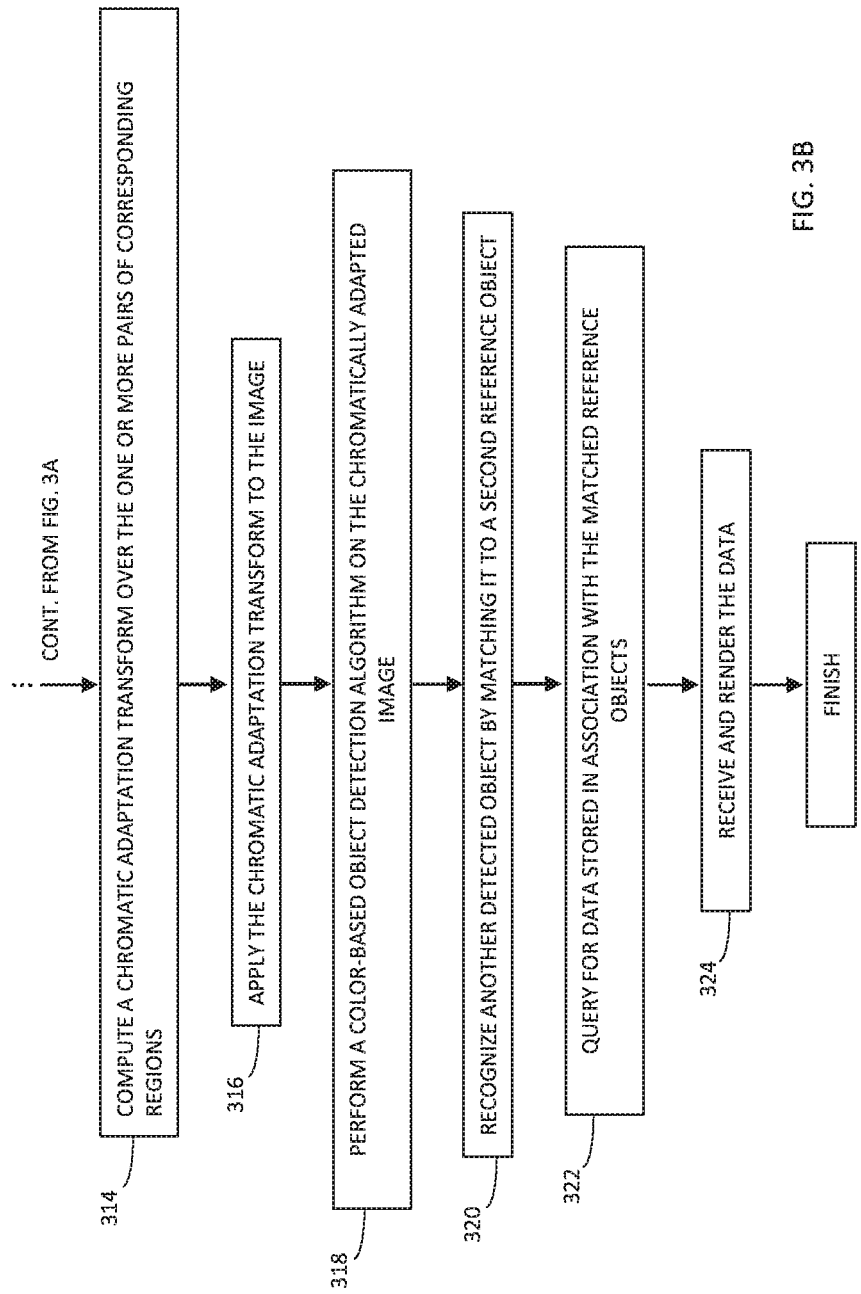

RECOGNITION-BASED COLOR CORRECTIONS

BACKGROUND

The invention relates to the field of computerized object recognition.

Lighting conditions greatly affect the color balance of digital photographs, and can at times produce inconsistent or distorting color casts. Some color balancing techniques, such the Von Kries method and white balancing techniques, operate directly on the red, blue, and green (RGB) channel pixel values of a digital image, to remove the distorting color cast. White balancing typically uses a neutral grey or white reference within the captured image, or an external reference to determine the correction necessary to remove an unrealistic color cast in the image. Other color balancing techniques use a calibration color chart, such as the Macbeth color chart, to determine the adjustment required to remove a color cast.

In addition to the esthetic loss of color-distorted images, an overly warm or cool color cast can impede applications such as automated object recognition. Although most digital cameras have some built-in color-corrective techniques, these are not always adequate to provide the color correction necessary to reliably recognize objects in a highly color-distorted image.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a method for computer-automated recognition of objects in digital imagery, comprising: performing a first computer-automated object recognition round on a digital image to recognize at least a first object, wherein recognizing the first object comprises detecting the first object and matching the first object with a first reference object; determining a chromatic adaptation transform between the first recognized object and the first reference object; applying the chromatic adaptation transform to the digital image; and performing a second computer-automated object recognition round on the chromatically adapted digital image to recognize a second object that is different than the first recognized object, wherein recognizing the second object comprises detecting the second object and matching the second object with a second reference object.

In some embodiments, the method further comprises using the computer-automated recognition of the first and second objects to receive data stored in association with any of the first and second reference objects; and rendering the associated data at an output interface.

In some embodiments, the method further comprises capturing the digital image.

In some embodiments, the method further comprises applying a low-pass filter to any of: the first recognized object, the first reference object, and any portion of the first recognized object and the first reference object, to remove outlying color values.

There is provided, in accordance with an embodiment, a computer program product comprising a non-transitory computer-readable storage medium having program code embodied thereon, the program code executable by at least one hardware processor to: perform a first computer-automated object recognition round on a digital image to recognize at least a first object, wherein recognizing the first object comprises detecting the first object and matching the first object with a first reference object; determine a chromatic adaptation transform between the first recognized object and the first reference object; apply the chromatic adaptation transform to the digital image; and perform a second computer-automated object recognition round on the chromatically adapted digital image to recognize a second object that is different than the first recognized object, wherein recognizing the second object comprises detecting the second object and matching the second object to a second reference object.

In some embodiments, the program code is further executable to use the computer-automated recognition of the first and second objects to receive data stored in association with any of the first and second reference objects and render the associated data at an output interface.

In some embodiments, performing the first computer-automated object recognition round comprises activating a texture-based object recognition engine on a grayscale version of the digital image, and wherein performing the second computer-automated object recognition round comprises applying a color-based object recognition algorithm on the digital image.

In some embodiments, determining the chromatic adaptation transform comprises: projectively transforming any of the first detected object and the first reference object to achieve a registration therebetween; identifying one or more corresponding regions on each of the first recognized object and the first reference object having a stable color; computing a chromatic adaptation transform between the one or more corresponding regions of the first reference object and the first recognized object.

In some embodiments, the chromatic adaptation transform is computed using an iterative reweighted least squares solution.

In some embodiments, the program code is further executable to apply a low-pass filter to any of: the first recognized object, the first reference object, and any portion of the first recognized object and the first reference object, to remove outlying color values.

There is provided, in accordance with an embodiment, a system comprising: (a) a non-transitory memory device having embodied thereon program code executable to: perform a first computer-automated object recognition round on a digital image to recognize at least a first object, wherein recognizing the first object comprises detecting the first object and matching the first object to a first reference object, determine a chromatic adaptation transform between the first recognized object and the reference object, apply the chromatic adaptation transform to the digital image, perform a second computer-automated object recognition round on the chromatically adapted digital image to recognize a second object that is different than the first recognized object, wherein recognizing the second object comprises detecting the second object and matching the second object to a second reference object; and (b) at least one hardware processor configured to execute said program code.

In some embodiments, the system further comprises a mobile device disposed with a camera configured to capture the digital image.

In some embodiments, the system further comprises a storage device configured to store the first and second reference objects, and data stored in association with the first and second reference objects; and a network configured to provide communication between the mobile device and the storage device, wherein the mobile device is further configured to use the computer-automated recognition of the first and second objects to receive, from the storage device via the network, the data stored in association with any of the first and second reference objects, and render the data at an output interface.

In some embodiments the program code is further executable to perform the first computer-automated object recognition round by activating a texture-based object recognition engine on a grayscale version of the digital image, and perform the second computer-automated object recognition round by applying a color-based object recognition algorithm on the digital image.

In some embodiments, determining the chromatic adaptation transform comprises: projectively transforming any of the recognized first object and the matched reference object to achieve a registration therebetween; identifying one or more corresponding regions on each of the recognized first object and the matched reference object having a stable color; and computing a local chromatic adaptation transform between the one or more corresponding regions of the reference object and recognized first object.

In some embodiments, the chromatic adaptation transform is computed using an iterative reweighted least squares solution.

In some embodiments, the program code is further executable to apply a low-pass filter to any of: the first recognized object, the first reference object, and any portion of the first recognized object and the first reference object, to remove outlying color values.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

FIGS. 2A-I illustrate an exemplary implementation of a method for associating one or more color-distorted detected objects with their corresponding real objects, in accordance with an embodiment;

FIGS. 3A-B, taken together, show a flowchart of a method for recognizing objects in a color-distorted image, in accordance with an embodiment.

DETAILED DESCRIPTION

A method, a system and a computer program product are disclosed herein, to correct a distorted color-cast of a query image to allow reliable recognition of multiple objects included therein. The method may be iterative, using successful object recognition results of a first recognition round to compute the color transformation necessary to correct the color of the recognized objects to accord with a set of reference objects captured under controlled, or studio illumination. This data-tailored color transformation, based on partial object recognition, may be extrapolated to the entire query image, and applied accordingly.

A second recognition round may be performed on the color-corrected image to recognize the objects that were not recognizable in the first round. Each recognized object may be defined as a bounding box roughly inscribing the object in the query image, its approximate spatial resolution in pixels per millimeter, and the object ID. Thus, the image-specific color transformation determined using the objects recognized in the first recognition round may be used in a manner similar to applying a Macbeth color-calibration chart to transform the query image, enabling the recognition of the remaining unrecognized objects via the second recognition round performed on the color-corrected image.

Figure 1A:
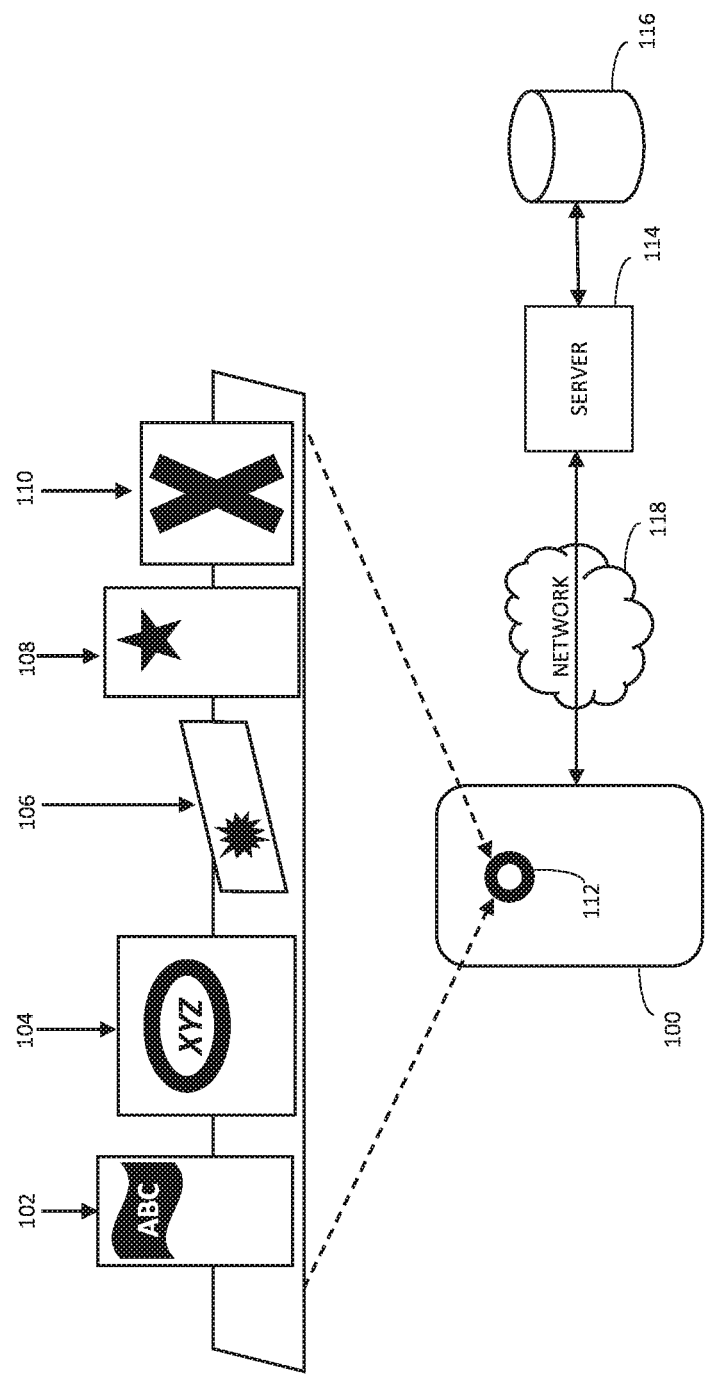
FIGS. 1A-C, taken together, show a system for associating a feature of a captured image with an object, in accordance with an embodiment.
Figure 1B:
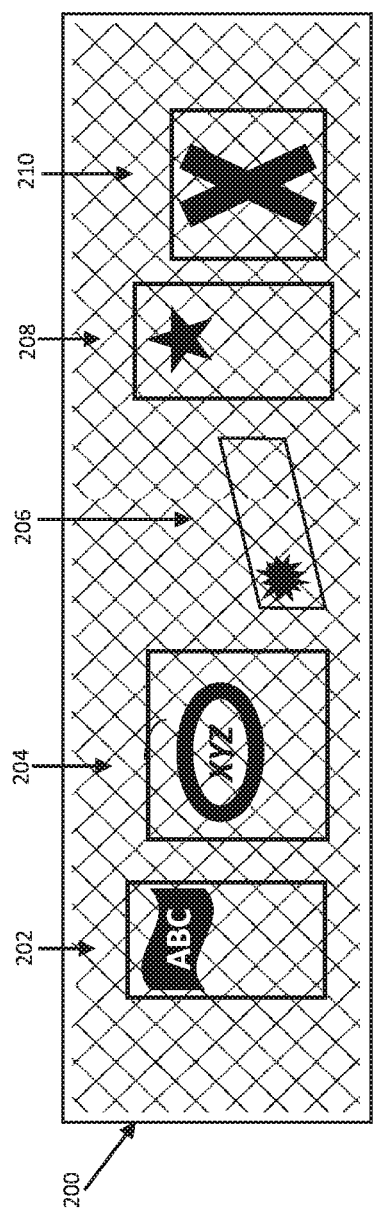
Figure 1C:
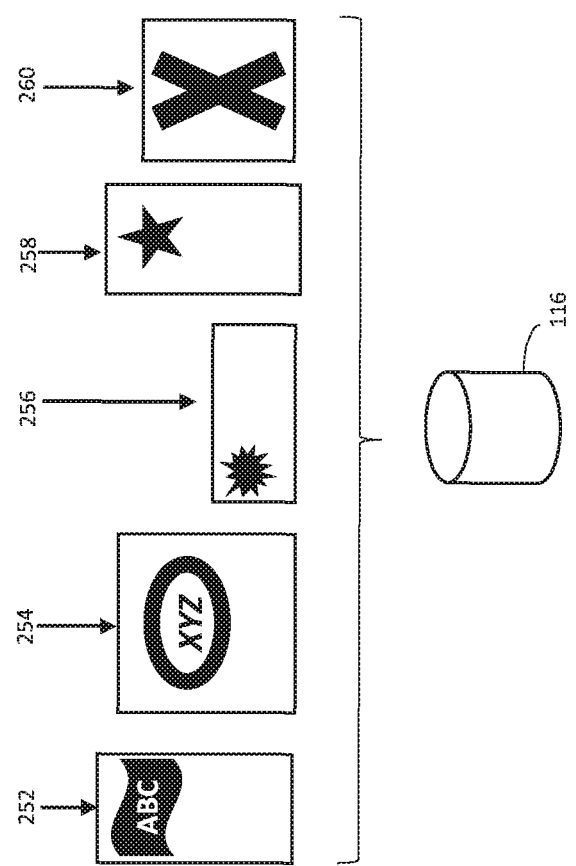

Reference is now made to FIGS. 1A-C, which, together, show a system for associating a feature of a captured image with an object, in accordance with an embodiment. A device 100, such as a mobile device, receives an image 200 (FIG. 1B) of multiple real objects, 102, 104, 106, 108, and 110, such as commercial products or other, by capturing image 200 with a camera 112 integrated with device 100. Real objects 102, 104, 106, 108, and 110 may have one or more identifying features comprising any of a shape, color, text, or logo to name a few. Device 100 may be operative with a server 114 and storage device 116 via a network 118 to detect one or more image objects 202, 204, 206, 208, and 210 of image 200 corresponding to real objects 102, 104, 106, 108, and 110, in accordance with a set of template, or reference objects 252, 254, 256, 258, and 260 such as may be captured under controlled 'studio' illumination, and stored at storage device 116, shown in FIG. 1C.

Referring to FIG. 1B, image 200 is shown with image objects 202, 204, 206, 208, and 210 corresponding to real objects 102, 104, 106, 108, and 110. Image 200 may include one or more distortions that may impede matching any of objects 202, 204, 206, 208, and 210 with reference objects 252, 254, 256, 258, and 260. For example, image 200 may have be captured under unknown and/or uncontrolled illumination, resulting in an overly 'warm' or 'cool' color balance, distorting the hue, tone and/or shade of image objects 202, 204, 206, 208, and 210, indicated as a cross-hatch pattern over image 200. Similarly, image 200 may have been captured while one or more of real objects 102, 104, 106, 108, and 110 were positioned non-orthogonally with respect to camera 112, resulting in a distorting skew in one or more of objects 202, 204, 206, 208, and 210. For example, real object 106, corresponding to rectangular reference object 256, is positioned at an angle while image 200 is captured, resulting in a skewed, non-rectangular image object 206 corresponding to real object 106.

Reference is now made to FIG. 2A-I which illustrate an exemplary implementation of a method executable by any combination of device 100 and/or server 114 for associating one or more of the color-distorted image objects with their corresponding real objects, in accordance with an embodiment. Device 100 may communicate with server 114 over network 118 allowing any of the steps described below to be performed at either of device 100 or server 114.

In a first stage, a texture-based object recognition engine, such as Scale-Invariant Feature Transform (SIFT), or Speeded Up Robust Features (SURF) technique may be activated on a grayscale version of image 200 to identify one or more image objects. An example of a method for object recognition in grayscale images may be found at *The MathWorks, Inc., "Object Detection in a Cluttered Scene Using Point Feature Matching", Web*, (http://www.mathworks.com/help/vision/examples/object-detection-in-a-cluttered-scene-using-point-feature-matching.html, last accessed Dec. 8, 2015). Additional object-detection techniques are found in K. Mikolajczyk, C. Schmid, *"A Performance Evaluation of Local Descriptors", IEEE transactions on pattern analysis and machine intelligence, vol.* 27, no. 10, October 2005.

Figure 2A:
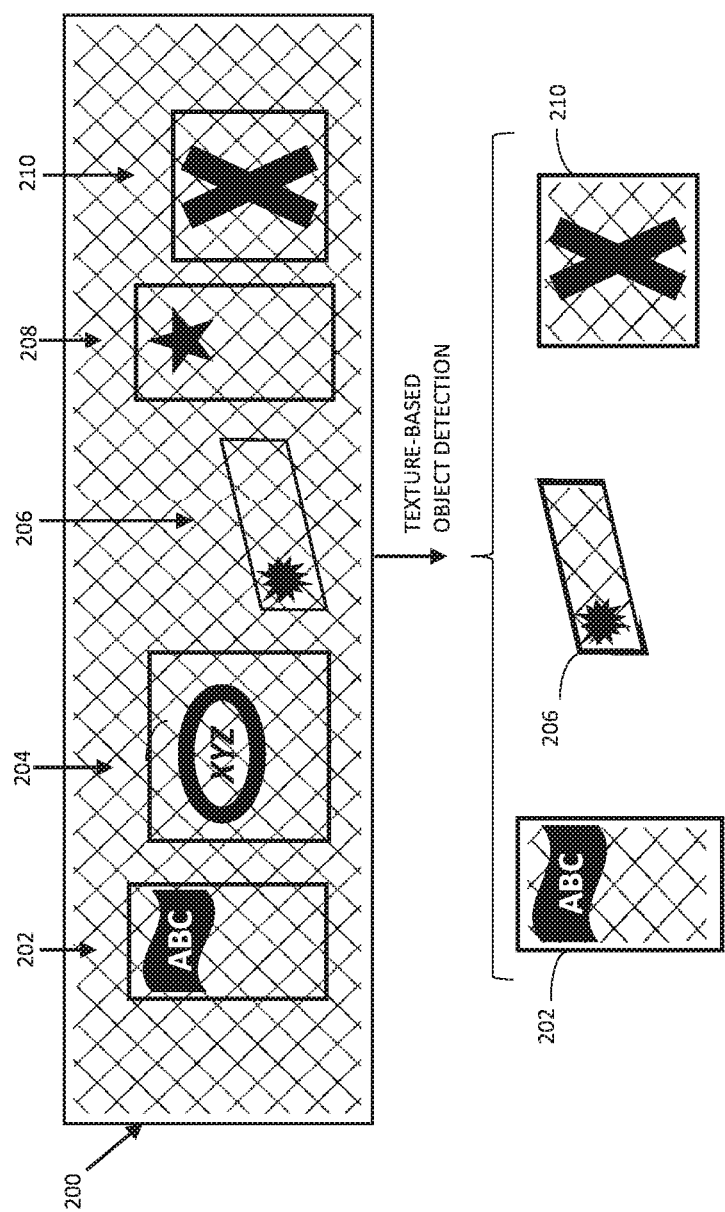
Figure 2B:
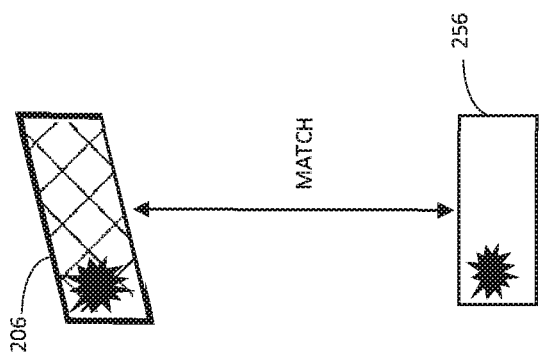
Figure 2B:
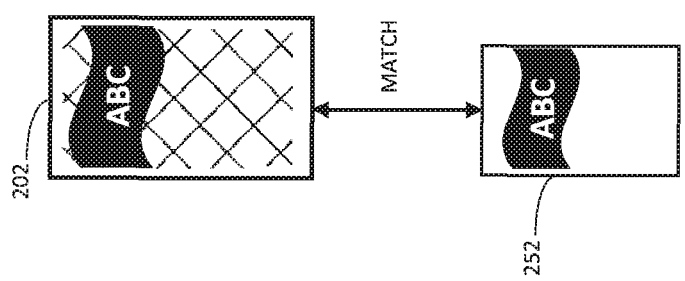

The texture-based object recognition engine may be activated on a grayscale version of image 200. In the example shown in FIG. 2A, the object recognition engine detects three such objects, 202, 206, and 210, defined by their outer border, or 'bounding box'. Due to the distorted color-balance of image 200, objects 204 and 208 are not detectable and/or recognizable by the engine. Further processing any of the detected objects may be subject to one or more confidence criteria. In the example of FIG. 2B, object 210 although detected, is determined to be too ambiguous and/or distorted for further processing.

In a second stage, at least some of the detected objects may be matched, or registered with a corresponding reference object and an object ID in accordance with one or more texture-based features, to define one or more registered matched object pairs, and thereby recognizing the objects. An exemplary method for registering the detected object with the corresponding reference object may be found in J. Kim, C. Liu, F. Sha, K. Grauman, *"Deformable Spatial Pyramid Matching for Fast Dense Correspondences", Proceedings of the IEEE Conference on Computer Vision and Pattern Recognition (CVPR)*, 2013. For example, FIG. 2B shows detected objects 202 and 206, defined with sufficient confidence in the first stage, matched with reference objects 252 and 256 having unique object IDs, respectively.

The member of each matched pair may be transformed via a transformation T1, comprising a registration between the pair members, to bring them into the same spatial resolution, such as a one-to-one pixel correspondence. T1 may be a projective transformation, or homography. In one embodiment, the transformation is performed on the larger member of each matched pair to transform it to the spatial resolution of the smaller member. A grid of local texture descriptors may be computed within the bounding box defined for each recognized object, as well as for each of the matched reference objects. Examples for such a descriptors are: SIFT, SURF, or KAZE, to name a few. Transformation T1 may use at least 4 matching points on each of the recognized object and reference object of each matched pair, and may apply any combination of the results of the previous application of the texture-based object recognition engine, or a re-application of the same or similar techniques. T1 may preserve the color-space definition of the transformed objects, and thus any color distortion included in image 200 may be substantially preserved in the projectively transformed objects.

Figure 2C:
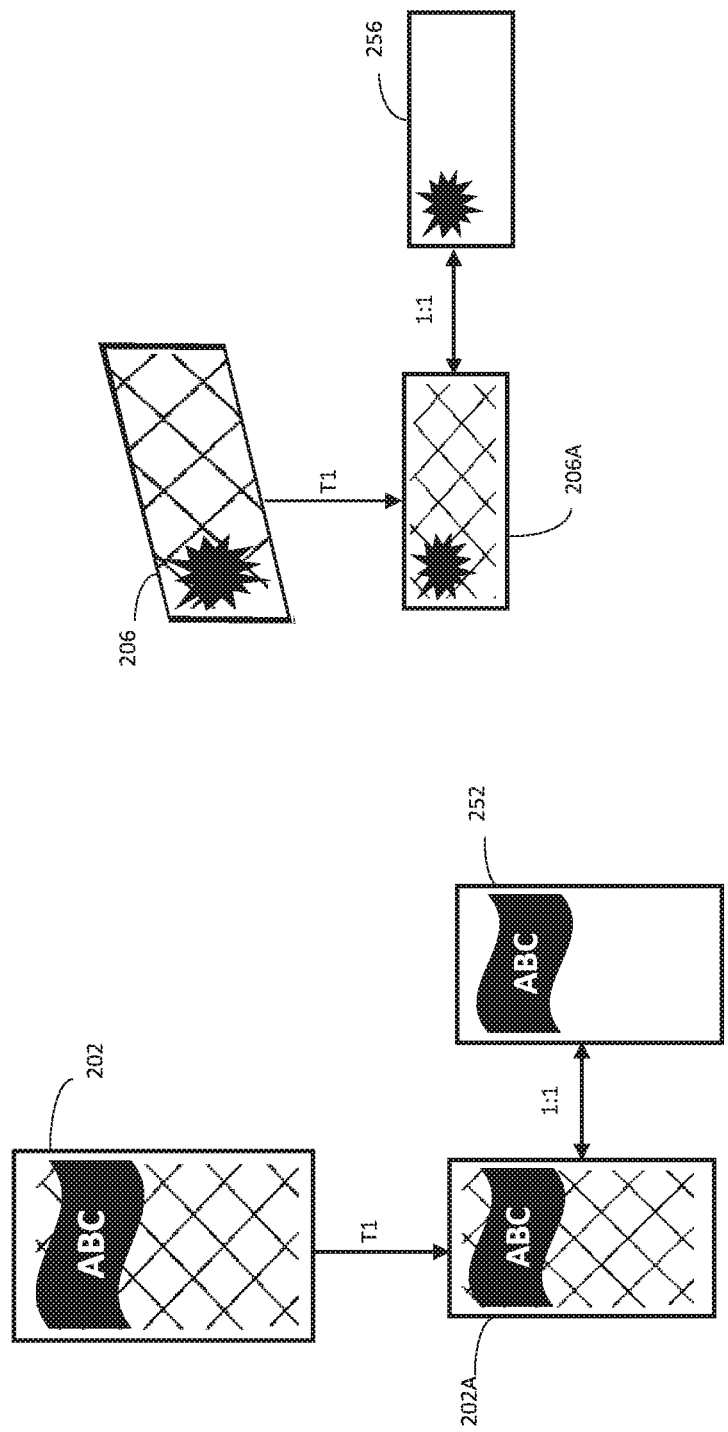

Referring to FIG. 2C, recognized objects 202 and 206 are shown projectively transformed via T1 to 202A and 206A, having a one-to-one pixel correspondence with their respective matched reference objects, 252 and 256. It may be noted that transforming the detected objects to the spatial resolution of the reference objects is but one non-limiting implementation, and in other implementations, the reference objects may be mapped to the spatial resolution of the detected objects. T1 may adjust any combination of size, skew or other attribute to achieve the one-to-one pixel correspondence. As shown in FIG. 2C, recognized object 202 is projectively transformed via T1, to correct for a sizing differential, to recognized object 202A having a one-to-one pixel correspondence with reference object 252; and recognized object 206 is projectively transformed via T1, by warping and shrinking to correct for both size differential and skew, to recognized object 206A having a one-to-one pixel correspondence with reference object 256. Thus, after applying T1, the matched pairs may be spatially aligned with each other, with the color distortion of image 200 substantially preserved in transformed objects 202A and 206A.

In a third stage, as a first step in identifying areas of stable color, a low pass filter corresponding to one or more of the RGB color channels may be applied to any of the recognized objects and/or reference objects to remove outlying RGB values. In a second step, one or more corresponding spatial regions, or 'patches' having a substantially stable red-blue-green (RGB) color definition, may be identified for the reference object and the recognized object of each matched pair. Color stability may be determined by computing the color gradient norm in each color layer of each reference object and matched transformed objects: pixels having a relatively low maximal gradient-norm across the color range, and thus, having a low variance over one or more of the RGB channels may be identified as belonging to color-stable regions. Color stability may be verified across corresponding pixels for each matched object pair and in some embodiments, only patches which are color-wise stable in both the reference objects and the matched image objects may be considered for determining the color transformation, which will be described in greater detail below.

Figure 2D:
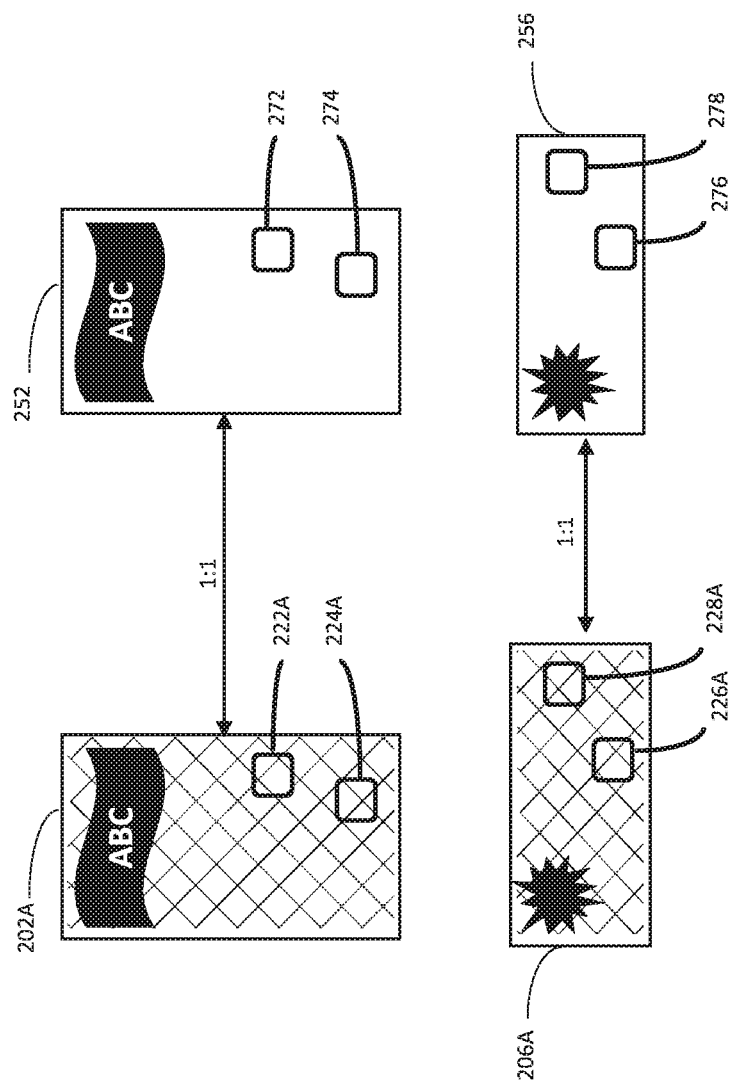

For example, referring to FIG. 2D, patch 272 of reference object 252 and patch 224A of transformed object 202A may be identified as contiguous pixel sets that are color-stable regions. Patch 272 may be mapped onto corresponding patch 222A of recognized object 202A, and patch 224A may be mapped onto corresponding patch 274 of matched reference object 252. The color stability of the mapped patches may be verified, accordingly. Similarly, patch 226A of transformed object 206A may be determined as a stable color region and mapped onto patch 276 of reference object 256, and patch 278 of reference object 256 may be determined as a stable color region and mapped onto patch 228A of transformed object 206A.

In a fourth stage, a global chromatic adaptation mapping, or transform T2, is computed that maps the color-space of the reference objects to that of the transformed objects obtained from the captured image, where color may be quantitatively measured according to conventional techniques. Multiple corresponding pairs of points $\{v'_i, v_i\}$ from each pair of corresponding patches may be extracted in tandem to determine transform T2, where $v'_i = T2 * v_i$, $v'_i$ is the RGB value for a pixel derived from the detected object, and $v_i$ is the RGB value for the corresponding pixel on the corresponding reference object. In some embodiments, all available pairs of mapped stable-color patches may be used to determine T2. The chromatic adaptation transform T2 may be defined as a 3×4 affine color transformation model. In this case, $v_i$ may be a four-parameter vector [R,G,B,1].

Figure 2E:
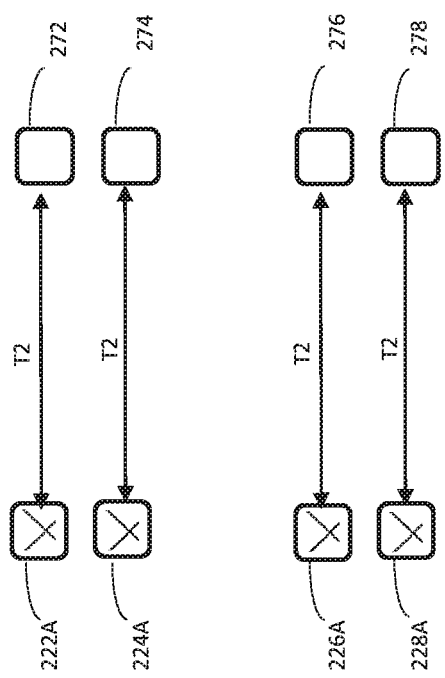

Referring to FIG. 2E, transform T2 may be defined over patch pairs (222A, 272), (224A, 274), (226A, 276) and (228A, 278) corresponding to the samples obtained from the filtered reference objects 252 and 256, and the filtered and transformed detected objects 202A and 206A, respectively. The transform T2 may be defined as the solution to the Least Squares problem applied to the mapped color-stable patches identified above:

$$\underset{T}{\operatorname{argmin}} \sum_{i} \|T * v_i - v'_i\|^2$$

where $v_i$ are the sampled color points in reference objects and $v'_i$ are the corresponding scene points. Thus, T2 minimizes the error between the color of the patches of the reference objects and the color of the patches derived from captured image 200. Applying T2 results in a correction that aligns the colors in the affine transformed objects 202A and 206A with the colors in the reference objects 252 and 256. Additionally, one or more techniques may be applied to account for any outlier point pairs or other discrepancies. For example, the Iteratively Reweighted Least Squares algorithm (IRLS) may be additionally or alternatively applied to the computation of the transform T2. In one embodiment, the Iterative Reweighted Least Squares (IRLS) algorithm may correspond to that described in Gentle, James (2007). "6.8.1 *Solutions that Minimize Other Norms of the Residuals*". *Matrix algebra*. New York: Springer. doi: 10.1007/978-0-387-70873-7. *ISBN* 978-0-387-70872-0, and additionally in Wikipedia contributors, "Iteratively reweighted least squares," *Wikipedia, The Free Encyclopedia*, Web, https://en.wikipedia.org/w/index.php?title=Iteratively_reweighted_least_squares&oldid=6 91031887 (last accessed Dec. 10, 2015).

Figure 2F:
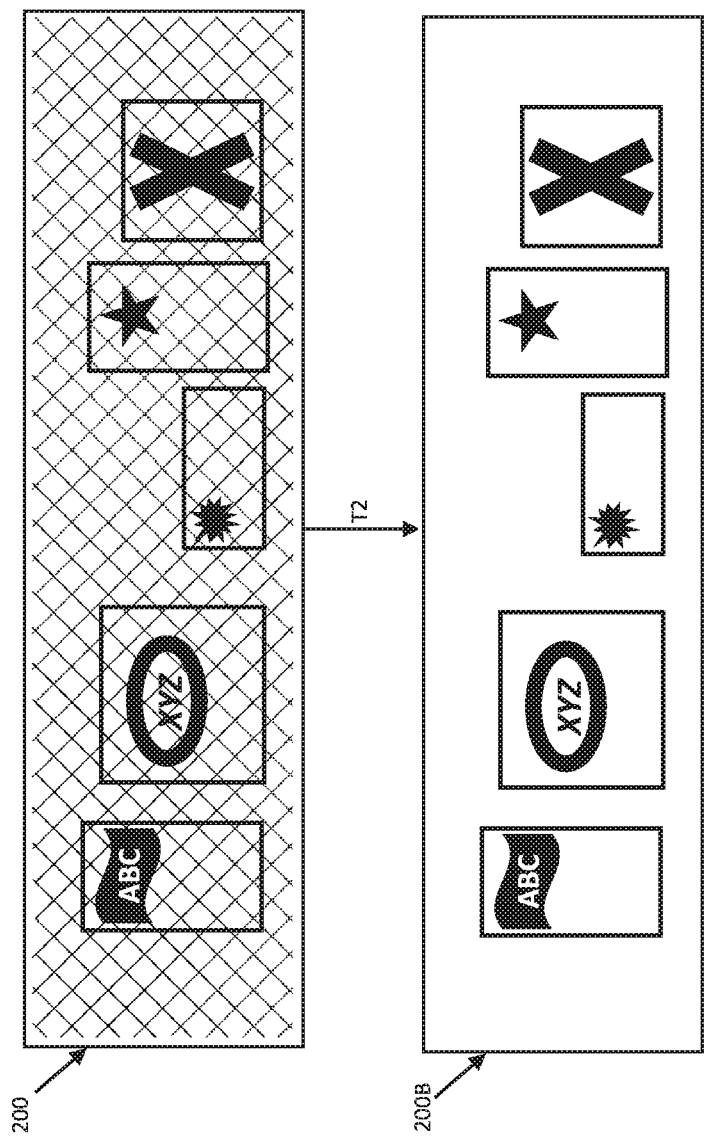

In the fifth stage, chromatic adaptation transform T2 is applied to image 200, converting its color-space to align with the reference objects. Referring to FIG. 2F, T2 is applied to image 200 having a distorted color-space, resulting in image 200B, having a color-space that is aligned with the reference objects 252, 254, 256, 258, and 260.

Referring to FIG. 2G, a color-based object recognition algorithm, such as SIFT or SURF, may now be applied to the color-corrected image 200B to detect objects that were not successfully recognized in the first stage, such as objects 204B and 208B that were not previously detected, and object 210B that was previously detected but with insufficient reliability to be matched with reference object 260, and thus not recognized.

Referring to FIG. 2H, the newly detected, color-corrected objects 204B, 208B, and 210B are shown matched to their respective reference objects 254 and 258, and 260 each having a unique object ID, and resulting in the recognition of objects 204B, 208B, and 210B.

In a sixth stage, data stored in associated with the reference objects may be retrieved using the unique IDs, and rendered on an output interface. For example, objects 102, 104, 106, 108, and 110 may be retail products and the associated data may relate to information, such as costs, inventory levels, and expiration or shipping dates of those products. On recognizing objects 202, 204, 206, 208, and 210 captured in image 200 and determining their associated unique IDs using the method described above, storage device 116 may be queried using the associated object IDs and, optionally the location data obtained when capturing image 200, to retrieve information relating to the specific real objects 102, 104, 106, 108, and 110. The information may be displayed on the screen of device 100, proving a user with the information.

Figure 2I:
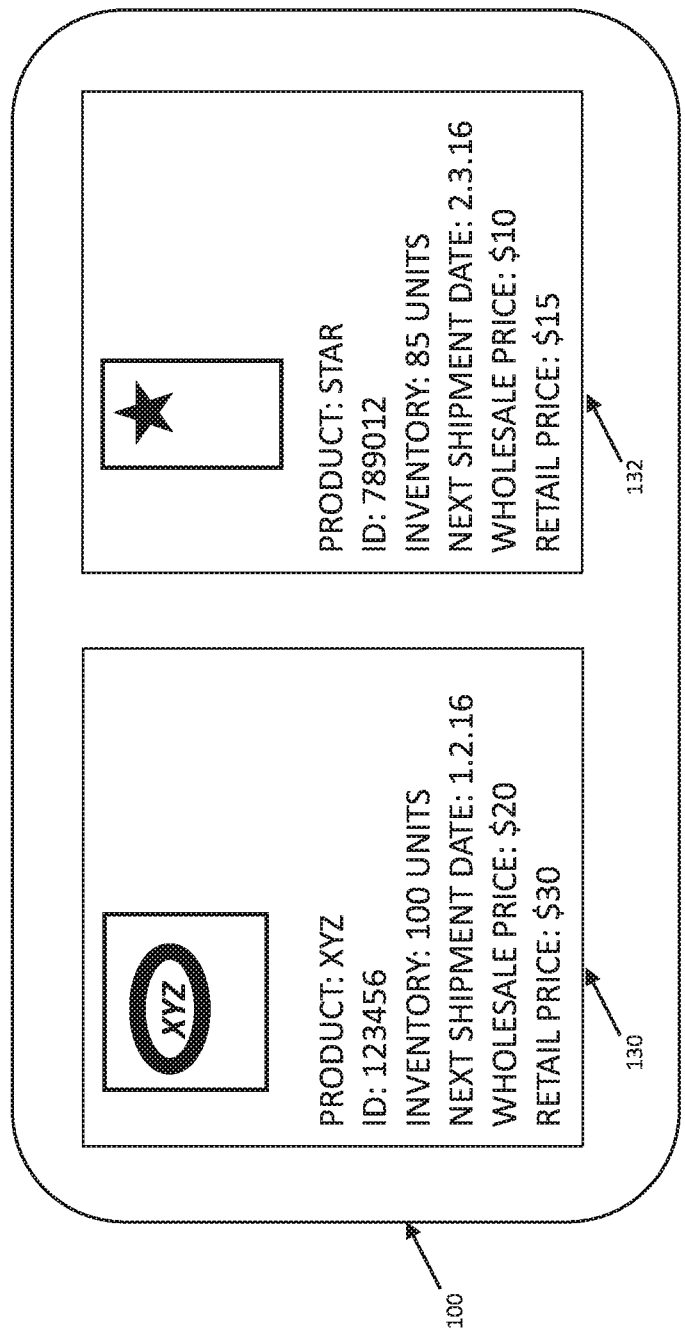

Referring to FIG. 2I, device 100 is shown displaying data sets 130 and 132 associated with real objects 104 and 108 and reference objects 254 and 258.

An exemplary implementation of an affine transformation T2 determined using the method above is shown below. T2 may be a 3×4 matrix operating on the [R,G,B,1] vector of each pixel of image 200.

$$T2 = \begin{bmatrix} 0.7375 & -0.7816 & 0.4313 & 0.3208 \\ -0.4046 & 0.4929 & 0.3569 & 0.4040 \\ -0.3590 & -0.7067 & 2.8516 & 0.3434 \end{bmatrix}$$

Such that $v'_i = T2 * v_i$

Thus, if image 200 was captured under excessively warm illumination, with an overall color-shift to red, transformation T2 may correct the color balance, by reducing the red and green components, corresponding to elements 1, 2 on the main diagonal shown having values less than 1, and reinforcing the blue component, corresponding to element 3 on the main diagonal having a value greater than 1.

Table 1 below illustrates exemplary hue values for a set of training points in image 200 selected from the stable-color patches identified in each registered object-pair and used to determine T2 in the first recognition round. The first column, labelled 'ORIGINAL', shows RGB values derived from stable patches of image 200 as captured under distorting illumination. The second column, labelled 'REFERENCE', shows RGB values for the corresponding pixels in the matched reference object. The corrective matrix T2 is determined using the values of the first and second columns. The third column, labelled 'CORRECTED', shows RGB values for the corrected image, after multiplying the RGB values of column 1 ('ORIGINAL') with T2:

TABLE 1 showing transformed hue values for the training set used in the first detection round to determine T2. The hue values are cyclic modulo 1. The original value of Point 2 is significantly distorted and corrected, via T2, to accord with its corresponding reference point.

|  | ORIGINAL | REFERENCE | CORRECTED |
|---|---|---|---|
| Point 1 | 0.502 | 0.572 | 0.572 |
| Point 2 | 0.007 | 0.977 | 0.984 |
| Point 3 | 0.241 | 0.301 | 0.305 |
| Point 4 | 0.364 | 0.383 | 0.411 |
| Point 5 | 0.480 | 0.550 | 0.565 |

Table 2 below illustrates exemplary hue values for a set of testing points obtained from the corrected image, after applying T2 determined using Table 1, to image 200:

TABLE 2 showing transformed hue values for a set of testing points after applying the color-corrective transformation T2 determined using Table 1, to the distorted image. The hue values are cyclic modulo 1.

|  | ORIGINAL | REFERENCE | CORRECTED |
|---|---|---|---|
| Point 6 | 0.016 | 0.943 | 0.946 |
| Point 7 | 0.003 | 0.6548 | 0.613 |
| Point 8 | 0.009 | 0.111 | 0.129 |
| Point 9 | 0.100 | 0.121 | 0.126 |
| Point 10 | 0.630 | 0.572 | 0.596 |

In some embodiments, transformation T2 may be evaluated to account for poor recognition results in the first detection round. In such a case, T2 may be overfitted on a poorly detected object, and applying T2 on the entire image may result in a color distortion. The following technique is but one quantitative method to evaluate T2:

Let M be a discrete set of cylindrical-coordinate color points (h, s, v) sampling the hue saturation brightness value (HSV) colorspace cylinder:

$$M = \{p = (h,s,v) | h \in r_H, s \in r_S, v \in r_V\}$$

where the points $r_H$, $r_S$, $r_V$ on the respective hue, saturation, and value axes may be evaluated as follows:

$$r_H = \{0, 1 \cdot 2\pi/m, 2 \cdot 2\pi/m, \ldots, (n-1) \cdot 2\pi/m\},$$
$$r_S = \{0, 1/n, 2/n, \ldots, (m-1)/n\},$$
and
$$r_V = \{0, 1/o, 2/o, \ldots, (m-1)/o\}$$

for integers n, m, o greater than 0. For example, m=n=o=100.

Given a colorspace transformation T, the points q=Tp, for all p∈M may be computed, where applying the transformation T implies converting the point p to coordinate basis of T, applying T via matrix-vector multiplication, and performing the inverse basis conversion. For each grid point p∈M, the distance d(p, q) in the HSV space may be computed as follows:

$$d(p,q) = \mod(2\pi, p_H - q_H) + \alpha|p_S - q_S| + \beta|p_V - q_V|$$

Where $d_M = \max_M\{d(p,q)|p \in M\}$ may be constrained within a predefined threshold c. Possible values for the constants are α=0.2, β=0.5, c=0.5.

Figure 3A:
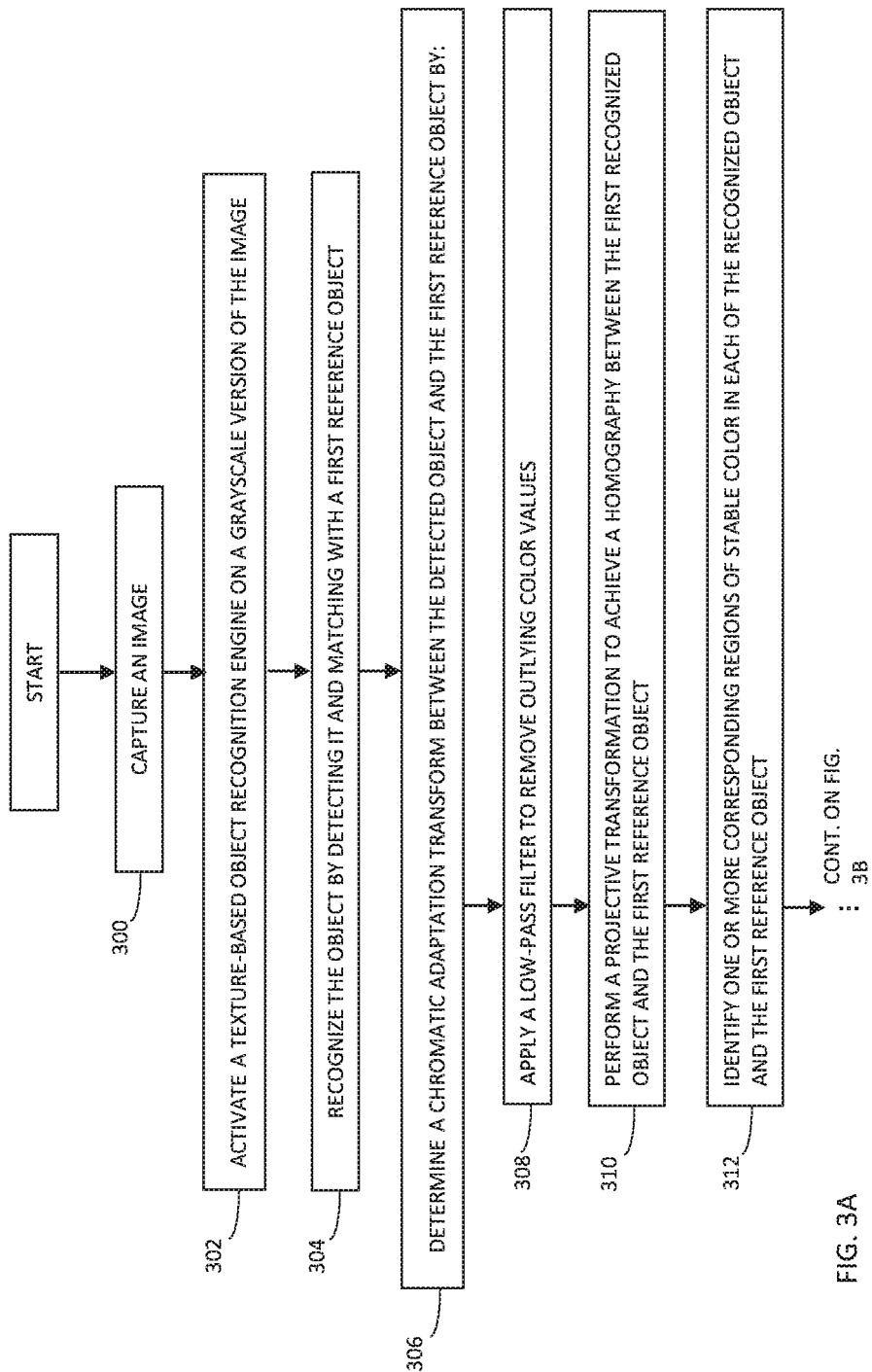

Reference is now made to FIG. 3, which shows a flowchart of a method for computer-automated recognition of objects in a color-distorted digital image, in accordance with an embodiment. A digital image may be captured (Step 300). In some embodiments, location-based data corresponding to the location where the image was captured may be stored in association with the image. A first computer-automated object recognition round may be performed on the image to recognize at least a first object (Step 302). In some embodiments, the first computer-automated object recognition round may comprise activating a texture-based object recognition engine on a grayscale version of the digital image. Recognizing the first object may include detecting the object and matching or registering it with a first reference object having a unique object ID (Step 304).

A chromatic adaptation transform may be determined between the first recognized object and the first reference object (Step 306). In some embodiments, determining the chromatic adaptation transform may comprise: a) applying a low-pass filter to remove outlying color values from any of the first recognized object or the first reference object (Step 308), b) projectively transforming any of the first recognized object and the first reference object to achieve a registration therebetween (Step 310); c) identifying one or more corresponding regions on each of the first recognized object and the first reference object having a stable color (Step 312), where the chromatic adaptation transform may be computed in accordance with an iterative reweighted least squares solution; and d) computing a chromatic adaptation transform over the one or more corresponding regions of the first reference object and the first recognized object (Step 314).

Thus determined, the chromatic adaptation transform may be applied to the digital image (Step 316). A second computer-automated object recognition round may be performed on the chromatically adapted image to detect a second object that wasn't recognized in the first round, and that is different than the first detected object (Step 318). The second computer-automated object recognition round may comprise applying a color-based object detection algorithm on the image. The second detected object may be recognized by matching it with a second reference object having a unique object ID (Step 320). The unique object IDs determined by the recognition of the first and second objects, and optionally the location-based data, may be used to query for data stored in association with any of the first and second reference objects (Step 322). The queried data may be received and rendered at an output interface (Step 324). For example, the data may be displayed on the output interface, or alternatively, the data may be used to trigger an alert, such as by flashing a light, or emitting a sound or vibrate signal on the device.

Figure 4:
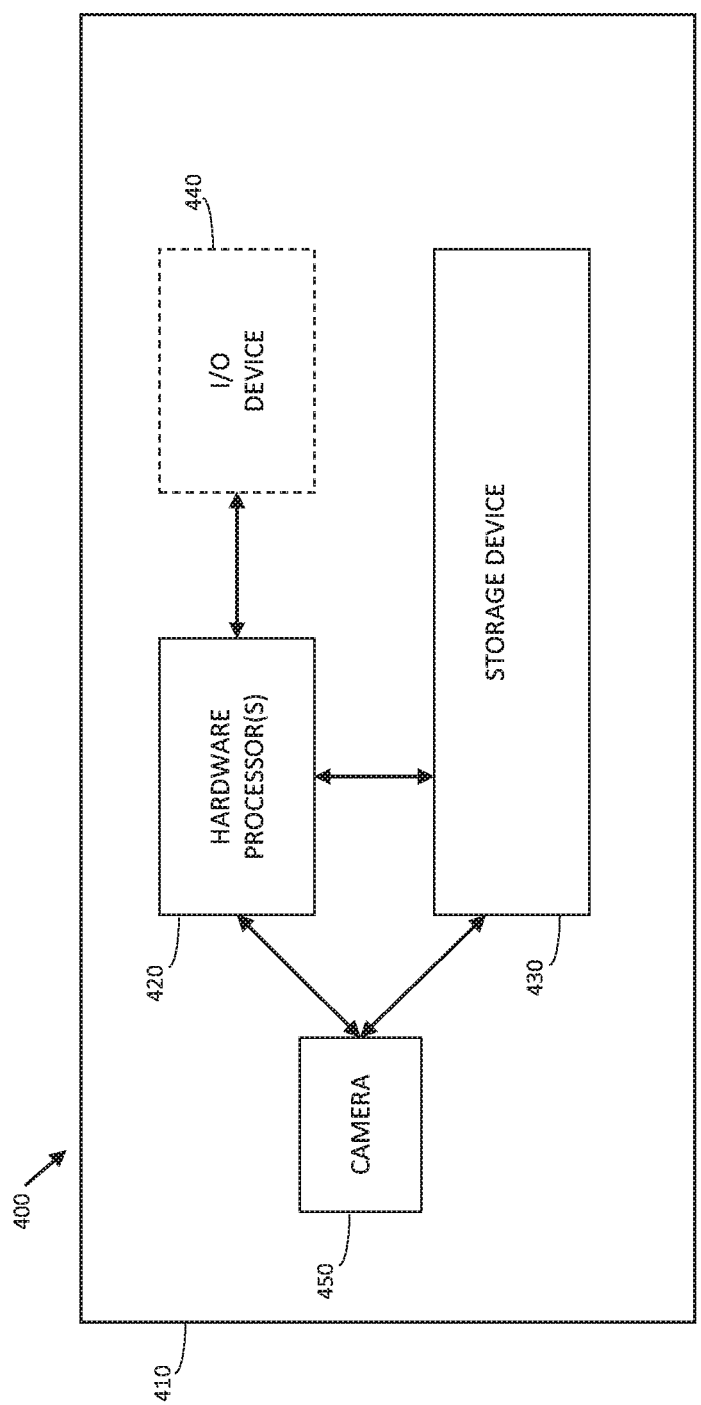
FIG. 4 shows an exemplary system according to an embodiment.

Reference is now made to FIG. 4, which shows an exemplary system 400, according to an embodiment. System 400 may include a computing device 410. Computing device 410 may include a hardware processor 420, a storage device 430, an optional input/output ("I/O") device 440, and optionally a digital camera 450. Hardware processor 420 may include one or more hardware processors, storage device 430 may include one or more storage devices and I/O device 440 may include one or more I/O devices, camera 450 may include one or more optical components. Hardware processor 420 may be configured to execute any of the steps of method of FIG. 2. I/O device 440 may be configured to provide and/or receive a data stream, and allow a user to interact with system 400. Dedicated software, implementing the method of FIG. 2 discussed above, may be stored on storage device 430 and executed by hardware processor 420.

In one embodiment, the method of FIG. 2 may be implemented on a single instance of system 400, such as a stand-alone computing device. In another embodiment, the method of FIG. 2 may be implemented on multiple instances of system 400, such as in a client-server configuration. In this embodiment, the steps of the method of FIG. 2 may be divided in any suitable manner over the multiple instances of system 400. For example, a first instance of system 400 may perform the sampling, distributing, and providing and configuring steps of FIG. 2, and the second instance of system 400 may render the provided data stream and representation responsive to an indication by a user.

In some embodiments, computing device 410 may include an I/O device 440 such as a terminal, a display, a keyboard, a mouse, a touch screen, a microphone, an input device and/or the like, to interact with system 400, to invoke system 400 and to receive results. It will however be appreciated that system 400 may operate without human operation and without I/O device 440.

In some exemplary embodiments of the disclosed subject matter, storage device 430 may include and/or be loaded with code for a user interface. The user interface may be utilized to receive input and/or provide output to and from system 400, for example receiving specific user commands and/or parameters related to system 400, providing output, or the like.

In some embodiments, camera 450 may be controllable and/or operable by hardware processor 420. Images captured by camera 450 may be stored at storage device 430 and accessible to processor 420 for processing and/or display at I/O 440.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the market site, or to enable others of ordinary skill in the art to understand the embodiments disclosed herein.

What is claimed is:

1. A method for computer-automated recognition of objects in digital imagery, comprising:
    performing a first computer-automated object recognition round on a digital image to recognize at least a first object, wherein recognizing the first object comprises detecting the first object and matching the first object with a first reference object, and wherein performing the first computer-automated object recognition round comprises activating a texture-based object recognition engine on a grayscale version of the digital image;

determining a chromatic adaptation transform between the first recognized object and the first reference object;

applying the chromatic adaptation transform to the digital image; and performing a second computer-automated object recognition round on the chromatically adapted digital image to recognize a second object that is different than the first recognized object, wherein recognizing the second object comprises detecting the second object and matching the second object with a second reference object and wherein performing the second computer-automated object recognition round comprises applying a color-based object recognition algorithm on the digital image.

2. The method of claim 1, further comprising:

using the computer-automated recognition of the first and second objects to receive data stored in association with any of the first and second reference objects; and rendering the associated data at an output interface.

3. The method of claim 1, further comprising capturing the digital image.

4. A computer program product comprising a non-transitory computer-readable storage medium having program code embodied thereon, the program code executable by at least one hardware processor to:

perform a first computer-automated object recognition round on a digital image to recognize at least a first object, wherein recognizing the first object comprises detecting the first object and matching the first object with a first reference object, and wherein performing the first computer-automated object recognition round comprises activating a texture-based object recognition engine on a grayscale version of the digital image;

determine a chromatic adaptation transform between the first recognized object and the first reference object;

apply the chromatic adaptation transform to the digital image; and perform a second computer-automated object recognition round on the chromatically adapted digital image to recognize a second object that is different than the first recognized object, wherein recognizing the second object comprises detecting the second object and matching the second object with a second reference object, and wherein performing the second computer-automated object recognition round comprises applying a color-based object recognition algorithm on the digital image.

5. The computer program product of claim 4, wherein the program code is further executable to use the computer-automated recognition of the first and second objects to receive data stored in association with any of the first and second reference objects and render the associated data at an output interface.

6. The computer program product of claim 4, wherein determining the chromatic adaptation transform comprises:

projectively transforming any of the first detected object and the first reference object to achieve a registration therebetween;

identifying one or more corresponding regions on each of the first recognized object and the first reference object having a stable color; and computing a chromatic adaptation transform between the one or more corresponding regions of the first reference object and the first recognized object.

7. The computer program product of claim 6, wherein the chromatic adaptation transform is computed using an iterative reweighted least squares solution.

8. The computer program product of claim 6, wherein the program code is further executable to apply a low-pass filter to any of: the first recognized object, the first reference object, and any portion of the first recognized object and the first reference object, to remove outlying color values.

9. A method for computer-automated recognition of objects in digital imagery, comprising:

performing a first computer-automated object recognition round on a digital image to recognize at least a first object, wherein recognizing the first object comprises detecting the first object and matching the first object with a first reference object;

determining a chromatic adaptation transform between the first recognized object and the first reference object, wherein determining the chromatic adaptation transform comprises:

projectively transforming any of the first recognized object and the first reference object to achieve a registration therebetween, identifying one or more corresponding regions on each of the first recognized object and the first reference object having a stable color, and computing a chromatic adaptation transform between the one or more corresponding regions of the first reference object and the first recognized object;

applying the chromatic adaptation transform to the digital image; and performing a second computer-automated object recognition round on the chromatically adapted digital image to recognize a second object that is different than the first recognized object, wherein recognizing the second object comprises detecting the second object and matching the second object with a second reference object.

10. The method of claim 9, wherein the chromatic adaptation transform is computed using an iterative reweighted least squares method.

11. The method of claim 9, further comprising applying a low-pass filter to any of: the first recognized object, the first reference object, and any portion of the first recognized object and the first reference object, to remove outlying color values.

* * * * *